(12) United States Patent
Ascheman

(10) Patent No.: US 7,654,131 B2
(45) Date of Patent: Feb. 2, 2010

(54) INSTRUMENT FOR ACCURATELY MEASURING MASS FLOW RATE OF A FLUID PUMPED FROM A HERMETICALLY SEALED CONTAINER

(75) Inventor: Timothy A. Ascheman, Ramsey, MN (US)

(73) Assignee: Mocon, Inc., Minneapolis, MN (US)

( * ) Notice: Subject to any disclaimer, the term of this patent is extended or adjusted under 35 U.S.C. 154(b) by 522 days.

(21) Appl. No.: 11/453,321

(22) Filed: Jun. 14, 2006

(65) Prior Publication Data
US 2007/0289390 A1    Dec. 20, 2007

(51) Int. Cl.
*G01M 3/34*    (2006.01)
*G01M 3/04*    (2006.01)
*G01F 15/00*   (2006.01)

(52) U.S. Cl. .......................... 73/49.3; 73/49.2; 73/276; 73/40

(58) Field of Classification Search .................. 73/49.3, 73/276, 40
See application file for complete search history.

(56) References Cited

U.S. PATENT DOCUMENTS

| | | | |
|---|---|---|---|
| 3,101,613 A | 8/1963 | Kuntz | |
| 3,633,416 A | 1/1972 | Van Dyke et al. | |
| 3,922,525 A | 11/1975 | Kozak et al. | |
| 3,952,580 A * | 4/1976 | Bennett | 73/61.71 |
| 4,067,239 A | 1/1978 | Arvisenet | |
| 4,105,138 A | 8/1978 | Lemann et al. | |
| 4,268,967 A | 5/1981 | Brana et al. | |
| 5,203,822 A * | 4/1993 | Gurich et al. | 73/149 |
| 5,212,993 A * | 5/1993 | Mayer | 73/864.21 |
| 5,332,008 A | 7/1994 | Todd et al. | |
| 5,564,306 A * | 10/1996 | Miller | 73/861 |
| 5,570,694 A | 11/1996 | Rometsch | |
| 6,189,223 B1 | 2/2001 | Haug | |
| 6,308,556 B1 * | 10/2001 | Sagi et al. | 73/40 |
| 2002/0069691 A1 * | 6/2002 | Roberts et al. | 73/46 |
| 2003/0084957 A1 | 5/2003 | Seitz et al. | |
| 2006/0011237 A1 * | 1/2006 | Tison et al. | 137/487.5 |
| 2007/0266773 A1 * | 11/2007 | Mayer et al. | 73/49.3 |

FOREIGN PATENT DOCUMENTS

| | | |
|---|---|---|
| EP | 0646781 | 4/1995 |
| EP | 0 883 744 B1 | 2/1997 |
| EP | 0 904 793 A2 | 9/1998 |
| GB | 2 311 865 A | 4/1997 |
| JP | 6 201432 | 7/1994 |
| WO | WO 2006/076110 * | 7/2006 |
| WO | WO 2006/083400 * | 8/2006 |

* cited by examiner

*Primary Examiner*—Lisa M Caputo
*Assistant Examiner*—Jonathan Dunlap
(74) *Attorney, Agent, or Firm*—Sherrill Law Offices, PLLC

(57) ABSTRACT

An instrument for accurately measuring mass flow rate of a fluid pumped from a hermetically sealed container, through attainment of a steady state mass flow rate, having a check valve positioned between a vacuum pump and a mass flow rate sensor.

9 Claims, 2 Drawing Sheets

INSTRUMENT FOR ACCURATELY MEASURING MASS FLOW RATE OF A FLUID PUMPED FROM A HERMETICALLY SEALED CONTAINER

BACKGROUND

Perishable products, such as packaged foods, have a shelf life which must be ascertained so that stale product is not sold to consumers. The shelf life of such products is commonly imprinted upon the package as the "expiration date" or "freshness date". Manufacturers, distributors and retailers of perishable products commonly prioritize the shipment, distribution and display of such products based upon the expiration date or freshness date of the product to reduce the amount of expired product which must be discarded.

One example of efforts taken to increase the shelf life of perishable products is flushing of the hermetically sealed packaging with an inert gas, such as nitrogen, to reduce the oxygen concentration within the packaging.

The shelf life of a perishable product can be determined by several methods depending upon the particular product involved (i.e., potato chips v. soft drinks). One of the variables often involved in determining shelf life is the amount of gas in the container.

Currently available instruments for measuring or estimating the amount of gas in a hermetically sealed container are unacceptably inaccurate, prohibitively expensive, difficult to conduct and/or slow.

Accordingly, a need exists for an inexpensive, quick, easy and accurate method and instrument for measuring the gaseous content of a hermetically sealed container.

SUMMARY OF THE INVENTION

The invention is an instrument for accurately measuring mass flow rate of a fluid pumped from a hermetically sealed container, through attainment of a steady state mass flow rate. The instrument includes a connection device for sealingly engaging a hermetically sealed container, a vacuum pump, a mass flow rate sensor and a check valve. The connection is configured and arranged to place a lumen defined by the connection device in sealed fluid communication with a retention chamber defined by hermetically sealed container. The vacuum pump sealingly communicates with the lumen defined by the connection device for evacuating gaseous content from a hermetically sealed container through the lumen. The mass flow rate sensor sealingly communicates with the lumen defined by the connection device for sensing mass flow rates pulled through the lumen. The check valve sealingly communicates with the lumen defined by the connection device and is positioned intermediate the vacuum pump and the mass flow rate sensor for inhibiting the sensing of negative flow spikes by the mass flow rate sensor.

DETAILED DESCRIPTION OF ONE EMBODIMENT OF THE INVENTION

Nomenclature

10 Instrument
20 Needle
21 Distal End of Needle
29 Lumen of Needle
30 Mass Flow Rate Sensor
40 Vacuum Pump
50 Check Valve
60 Processor
65 Memory
70 Hardware Interface Port
80 Collective Reference to Tubing 80a, 80b, 80c and 80d
80a Length of Tubing Interconnecting the Needle and the Mass Flow Rate Sensor
80b Length of Tubing Interconnecting the Mass Flow Rate Sensor and the Check Valve
80c Length of Tubing Interconnecting the Check Valve and the Vacuum Pump
80d Length of Tubing exiting the Vacuum Pump
90 Collective Reference to Electrical Leads 90a and 90b
90a Electrical Lead from the Processor to the Mass Flow Rate Sensor
90b Electrical Lead from the Processor to the Vacuum Pump
100 Container or Packaging
101 Solids Content of Packaging
102 Gaseous Content of Packaging
109 Retention Chamber Defined by Packaging
200 Septum

Definitions

As utilized herein, including the claims, the phrase "hermetically sealed container" includes true hermetically sealed containers, and containers intended to be hermetically sealed but having one or more small leaks resulting in a combined rate of flow through the leaks of less than 400 cm$^3$ per minute at 200 mm Hg.

As utilized herein, including the claims, the Ideal Gas Law refers to the mathematical equation set forth below which is deduced from kinetic theory. The ideal gas law can be viewed as arising from the kinetic pressure of gas molecules colliding with the walls of a container in accordance with Newton's laws.

$$PV = nRT = NkT$$

Where:
P=Pressure
V=Volume
T=Temperature
n=Number of moles
R=Universal gas constant=8.3145 J/mol K
N=number of molecules
k=Boltzmann constant=$1.38066 \times 10^{-23}$ J/K=$8.617385 \times 10^{-5}$ eV/K
k=$R/N_A$
$N_A$=Avogadro's number=$6.0221 \times 10^{23}$/mo

Underlying Discovery

Accurate measurement of a mass flow rate becomes increasingly difficult as the vacuum pressure approaches the performance limitation of the vacuum pump due to backflow. The invention disclosed herein is based upon the discovery that backflow, and the negative spikes in sensed mass flow rates caused by such backflow, can be controlled by deploying a check valve between the mass flow rate sensor and the pump.

Instrument

Figure 1:
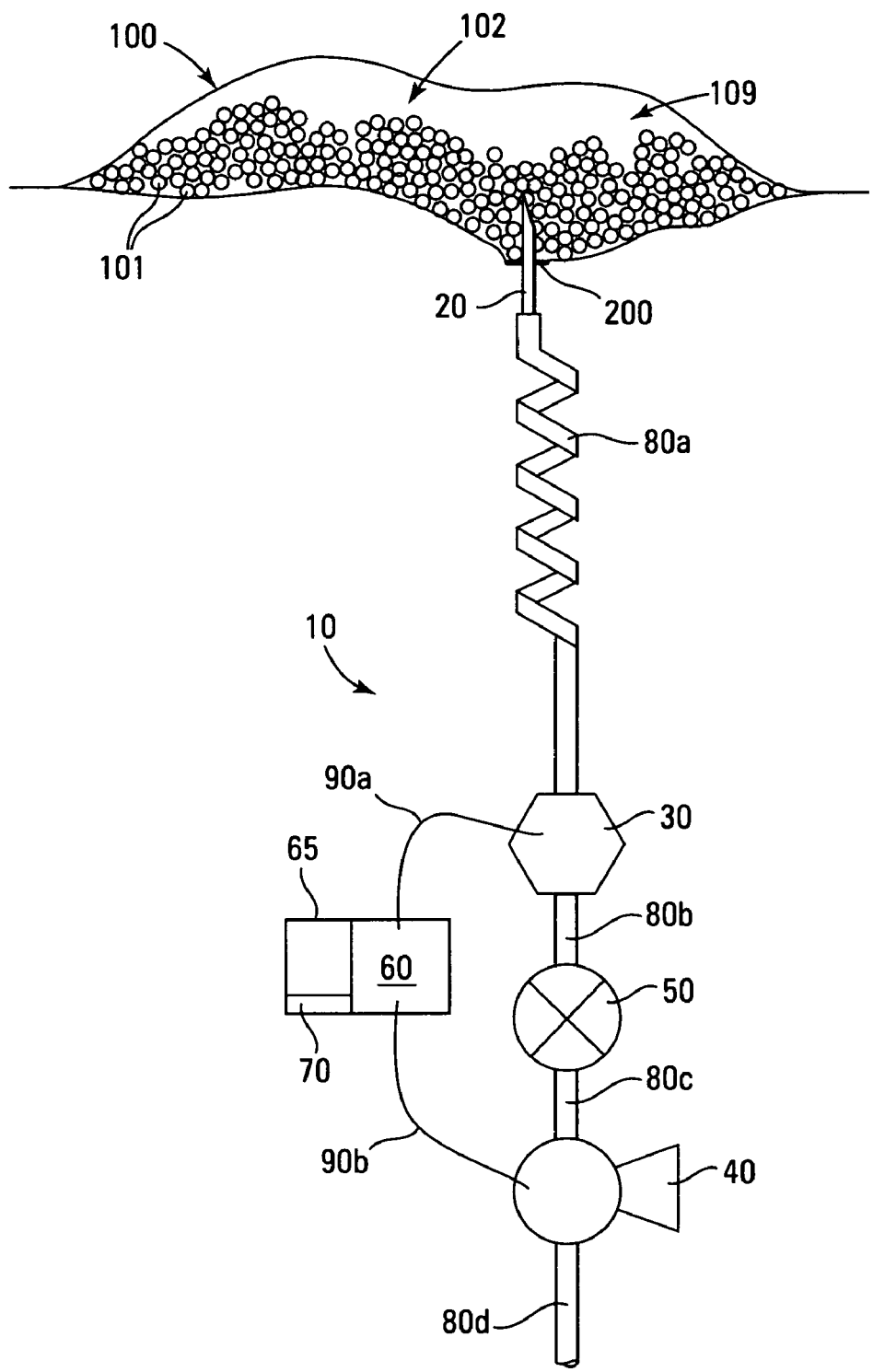
FIG. 1 is a schematic view of one embodiment of the invention with the needle inserted through a flexible bag containing a snack food.

As shown in FIG. 1, the invention is an instrument 10 for measuring the mass flow rate of a fluid 102 pulled from a hermetically sealed container 100. The container 100 depicted in FIG. 1 is a variable volume, pressure conforming container 100, but the instrument 10 works equally well with rigid wall, fixed volume containers 100.

The instrument 10 can be effectively employed with a wide variety of hermetically sealed, variable volume, pressure conforming packaging 100 containers ranging from fairly rigid packaging such as thin-walled polyvinyl chloride tubes, through semi-flexible packaging 100 such as wax-coated cartons and thin-walled polyethylene bottles, to highly flexible packaging 100 such as bags made from polyethylene terephthalate (i.e., MYLAR®) or polyethylene films.

Referring to FIG. 1, the instrument 10 includes a needle 20, a mass flow rate sensor 30, a vacuum pump 40, a check valve 50 and a processor 60 with associated memory 65. The instrument 10 preferably includes a hardware interface port 70. Appropriate tubing 80a, 80b, and 80c (hereinafter collectively referenced along with tubing 80d as tubing 80) sequentially interconnect the needle 20, mass flow rate sensor 30, check valve 50, and vacuum pump 40, respectively. Appropriate electrical leads 90a, and 90b (hereinafter collectively referenced as electrical leads 90) electrically connect the processor 60 to the mass flow rate sensor 30 and the vacuum pump 40, respectively.

Figure 2:
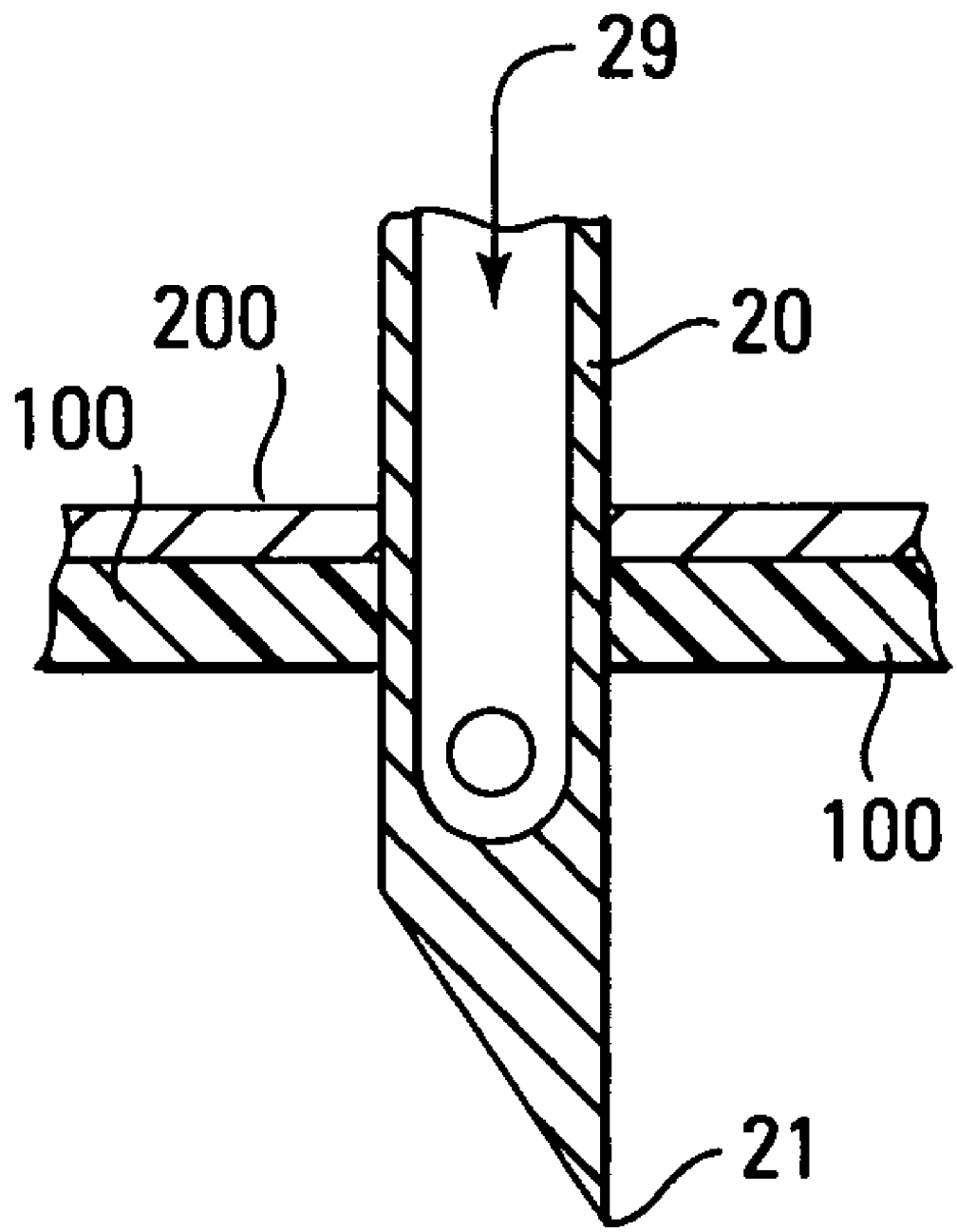
FIG. 2 is an enlarged view of the needle at the insertion point into the bag as shown in FIG. 1.

As shown in FIG. 2, the needle 20 is configured and arranged with a lumen 29 and a sharp pointed distal end 21 effective for piercing a sidewall (unnumbered) of the packaging 100. A septum 200 is preferably adhered to the sidewall of the packaging 100—especially when the packaging 100 is highly flexible—prior to piercing of the packaging 100 with the needle 20 in order to maintain a hermetic seal around the needle 20.

Other connection devices for achieving sealed fluid communication with the retention chamber 109 of a package 100 can also be employed, including specifically, but not exclusively, any of the various quick disconnect couplings commonly employed with pneumatic and hydraulic systems.

Referring to FIG. 1, a vacuum pump 40 is sealingly connected to the lumen 29 of the needle 20 by tubing 80a, 80b and 80c. Once the needle 20 has been inserted through packaging 100, operation of the vacuum pump 40 is effective for evacuating the gaseous content 102 from the retention chamber 109 defined by the packaging 100 through the lumen 29 of the needle 20.

Substantially any type of vacuum pump 40 is suitable for use in the instrument 10, with selection dependent primarily upon choice of power source (i.e., battery or electrical power lines), desired level of portability (i.e., hand-held or desktop), and intended use (i.e., testing of large volume or small volume packaging 100). For many applications, a vacuum pump 40 with a maximum gas volumetric flow rate of about 250 to 6,000 cm$^3$/minute and capable of pulling a vacuum of greater than about 0.5 lb/in$^2$, preferably 1-4 lb/in$^2$, using standard consumer batteries (e.g., AAA, AA, A, C, D or 9-volt batteries) will be sufficient.

As shown in FIG. 1, a mass flow rate sensor 30 is positioned upstream from the vacuum pump 40 for measuring the mass flow rate pulled from the retention chamber 109 by the vacuum pump 40. The mass flow rate sensor 30 may alternatively be positioned downstream from the vacuum pump 40. The mass flow rate of interest is the mass flow rate measured until the gaseous content 102 has been evacuated from the retention chamber 109 and an essentially steady state flow has been established from the retention chamber 109, indicating that the original gaseous content 102 has been evacuated from the retention chamber 109 and any further mass flow is the result of flow through a leak in the packaging 100.

Suitable gas mass flow rate sensors 30 for use in the instrument 10 are available from a number of sources, including MKS Instruments of Wilmington, Mass.

A check valve 50 is positioned between the mass flow rate sensor 30 and the vacuum pump 40 to prevent backflow of gaseous content 102 into sensing contact with the mass flow rate sensor 30, a phenomenon often observed when pulling a vacuum near the functional limitations of the vacuum pump 40 deployed in the instrument 10.

Referring to FIG. 1, the mass flow rate sensor 30 and vacuum pump 40 are operably interconnected to a microcontroller or processor 60 by appropriate leads 90a and 90b respectively, for controlling operation of these components, and receiving and processing data signals generated by the mass flow rate sensor 30. The processor 60 is connected to a suitable power source, such as a battery (not shown). The mass flow rate sensor 30, vacuum pump 40, check valve 50 and processor 60, along with associated tubing 80, electrical leads 90 and battery, are preferably retained within a single housing (not shown) is equipped with necessary and appropriate inlets (not shown), outlets (not shown) and user interface components (not shown).

As shown in FIG. 1, the microcontroller or processor 60 includes associated memory 65 for storing data values received from the mass flow rate sensor 30.

The microcontroller or processor 60 is programmed to (1) initiate operation of the vacuum pump 40 upon receipt of an initiation signal, and (ii) receive data values from the mass flow rate sensor 30 over time as the vacuum pump 40 pumps the gaseous content 102 of a test package 100 through the mass flow rate sensor 30. The microcontroller or processor 60 can also be programmed to utilize such mass flow rate data values to calculate various values such as (i) the mass (g), number of moles (n) or number of molecules (N) of fluid pumped from the container 100, (ii) the volume of the container 100 using the Ideal Gas Law, etc. The microcontroller or processor 60 can communicate such mass flow rate data values or calculated values to a user via a display device (not shown) and/or transmits this data to a peripheral device such as a central processing unit or printer via a hardware interface port 70.

The instrument 10 may be constructed as a portable or desktop unit.

Use

A unit of packaging 100 having a gaseous content 102, and typically a solids content 101 of a perishable good, and is selected for analysis. A power switch (not shown) is depressed to activate the instrument 10 and a START button (not shown) is depressed. The instrument 10 may optionally direct the user to insert the needle 20 into the test packaging 100.

A septum 200 is optionally adhered to the outer surface (unnumbered) of the packaging 100. The septum 200 and packaging 100 are perforated by the distal end 21 of the needle 20 a sufficient distance to place the lumen 29 into fluid communication with the retention chamber 109 defined by the packaging 100. The needle 20 is then left in the inserted position for the balance of the procedure.

The user then initiates analysis by again pressing the START button. The vacuum pump 40 is activated to evacuate the gaseous content 102 from the retention chamber 109 defined by the packaging 100. The mass flow rate sensor 30 is activated to sense the mass flow rate of gas through the tubing 80 over time and transmits this data to the processor 60.

When the mass flow rate of gas through the tubing 80 reaches a steady state value, the processor 60 establishes a stop point along the time line indicative of the time at which the original gaseous content 102 of the packaging 100 has been fully evacuated and any residual flow through the tubing 80 is the result of gas flow through leak(s) in the packaging 100. The processor 60 stores the mass flow rate values in memory 65 for use, either by the processor 60 or an external peripheral device (not shown) to calculate one or more parameters for the container 100, such as the volume of the container 100.

The testing procedure can then be repeated simply by pressing the START button again.

I claim:

1. An instrument for accurately measuring mass flow rate of a fluid pumped from a hermetically sealed container, through attainment of a steady state mass flow rate for purposes of detecting any leaks through the container, comprising:
   (a) a connection device defining a lumen, the connection device configured and arranged to sealingly engaging a hermetically sealed container so as to place the lumen defined by the connection device in fluid communication with a retention chamber defined by such a container,
   (b) a vacuum pump in sealed fluid communication with the lumen defined by the connection device effective for continuously pumping gaseous content from a hermetically sealed container through the lumen until a steady state mass flow rate is attained,
   (c) a mass flow rate sensor in sealed fluid communication with the lumen defined by the connection device for sensing mass flow rates pulled through the lumen until at least a steady state mass flow rate is attained, and
   (d) a check valve in sealed fluid communication with the lumen defined by the connection device and positioned intermediate the vacuum pump and the mass flow rate sensor for inhibiting the sensing of negative flow spikes by the mass flow rate sensor.

2. The instrument of claim 1 further comprising a microprocessor in electrical communication with the mass flow rate sensor for (A) receiving mass flow rate signals from the sensor, (B) integrating the received mass flow rate signals over time through achievement of an evacuated retention chamber to generate a total mass value, and (C) calculating a volume from the total mass value employing the ideal gas law.

3. The instrument of claim 2 wherein the connection device is a needle.

4. The instrument of claim 2 wherein the vacuum pump is positioned downstream from the mass flow rate sensor.

5. The instrument of claim 1 further comprising a microprocessor in electrical communication with the mass flow rate sensor for (A) receiving mass flow rate signals from the sensor, and (B) reporting the mass flow rate value at equilibrium.

6. The instrument of claim 5 wherein the connection device is a needle.

7. The instrument of claim 5 wherein the vacuum pump is positioned downstream from the mass flow rate sensor.

8. The instrument of claim 1 wherein the connection device is a needle.

9. The instrument of claim 1 wherein the vacuum pump is positioned downstream from the mass flow rate sensor.

* * * * *